No. 745,521. PATENTED DEC. 1, 1903.
E. C. REDFEARN.
LACTOMETER.
APPLICATION FILED DEC. 9, 1902.

NO MODEL.

WITNESSES:
C L Creelman
P C Dormitzer

INVENTOR
Edward C. Redfearn.
BY
Pierre Barnes.
ATTORNEY

No. 745,521.          Patented December 1, 1903.

UNITED STATES PATENT OFFICE.

EDWARD C. REDFEARN, OF GALENA, ILLINOIS.

LACTOMETER.

SPECIFICATION forming part of Letters Patent No. 745,521, dated December 1, 1903.

Application filed December 9, 1902. Serial No. 134,551. (No model.)

*To all whom it may concern:*

Be it known that I, EDWARD C. REDFEARN, a citizen of the United States, residing at Galena, in the county of Jo Daviess and State of Illinois, have invented certain new and useful Improvements in Lactometers, of which the following is a specification, reference being had therein to the accompanying drawings.

My invention has for its object to provide for use with a can, cup, or such like kitchen utensil a device for determining by its density the quantity of milk contained in said receptacle. In addition to this feature the device is constructed so as to be detachably secured to the vessel in order that it may be quickly and thoroughly cleaned. These ends are attained by the novel construction of parts and combinations thereof, as hereinafter described, and illustrated in the accompanying drawings.

Figure 2:
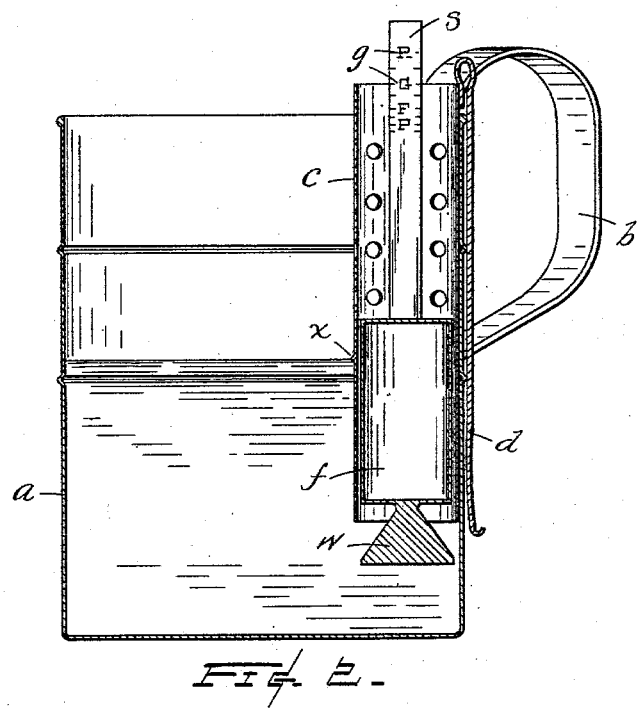
Figure 1:
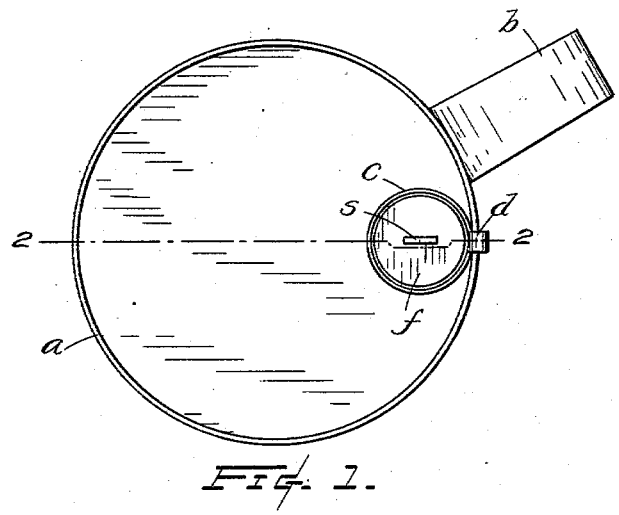

In the drawings, Figure 1 is a plan view of a milk-receptacle with my invention applied thereto, and Fig. 2 is a vertical section taken on line 2 2 of Fig. 1.

Referring to the drawings by letter, *a* represents a milk-receptacle, which in this instance is a cup provided with the usual handle *b*.

*c* is a cylindrical tube or socket made, preferably, of perforated sheet metal open at both ends and provided with a resilient clip *d*, which is hooked over the rim of the receptacle to detachably secure the socket against the inside of the receptacle, so that an index-mark or indent *x* of the socket will correspond with the surface of the milk, which is accomplished by simply moving the socket up or down until the said mark coincides with the said surface or by pouring in the milk until it reaches the indicated height on the socket previously attached.

Interiorly of the socket is a hollow cylindrical float of less diameter than the inside of the socket, in order that it may move freely therethrough, and is integrally connected at its lower end to a weight *w* and at the opposite end to a stem *s*. The former, *w*, is preferably of conical shape and secured at its apex to the float, and the stem, which is inscribed with graduate-marks *g*, extends axially of the float. The said graduate-marks are disposed upon the stem in such positions as to indiate by their several heights relative of the upper edge of the socket the density and very closely the quality of the milk sustaining the float. For example, skimmed milk or milk which has been diluted with water is of greater specific gravity, and consequently the float would not be submerged as much and the stem project farther above the edge of the socket than where better milk, having its normal quantity of cream, was being tested.

If desired, the socket may be secured permanently to the utensil, though at a sacrifice of convenience of cleaning, but which in a measure may be overcome by making the several parts of aluminium or other non-corrosive material.

Having described my invention, what I claim as new, and desire to secure by Letters Patent, is—

1. The herein-described device, comprising a perforated cylindrical socket open at both ends, an index-mark on the socket, a resilient hook integral with said socket for detachably securing the same to a vessel, a cylindrical float of less diameter than the said socket, a stem having graduate-marks thereon extending axially from an end of said float, and a weight fixedly secured to the other end, substantially as and for the purposes set forth.

2. In a device of the character described, the combination with a vessel, of a cylindrical socket open at both ends, means for adjustably securing the same to said vessel, a cylindrical float having a stem extending axially therefrom, and a weight secured to the said float on the end opposite said stem.

3. In a device of the character described, a perforated cylindrical socket open at both ends, an index-mark thereon, a hook integral with said socket and substantially the length thereof for adjustably and detachably securing the socket to a vessel, a cylindrical float slidably arranged within said socket, a stem having graduated marks thereon extending from the upper end of the float, and an integral weight on the opposite end of said float and of less diameter than said socket.

In testimony whereof I affix my signature in presence of two witnesses.

EDWARD C. REDFEARN.

Witnesses:
 PIERRE BARNES,
 HENRY S. NOON.